(12) United States Patent
Konno

(10) Patent No.: US 8,300,142 B2
(45) Date of Patent: Oct. 30, 2012

(54) IMAGING APPARATUS HAVING ADJUSTABLE POWER SUPPLY BASED ON IMAGER SENSITIVITY

(75) Inventor: Hiroshi Konno, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 221 days.

(21) Appl. No.: 12/871,269

(22) Filed: Aug. 30, 2010

(65) Prior Publication Data

US 2011/0050945 A1 Mar. 3, 2011

(30) Foreign Application Priority Data

Sep. 2, 2009 (JP) ................. 2009-203183

(51) Int. Cl.
*H04N 5/225* (2006.01)
(52) U.S. Cl. ..................................... 348/372; 348/241
(58) Field of Classification Search ............. 348/207.99, 348/222.1, 241, 308, 312, 362, 371, 372; 250/214 SW; 382/317
See application file for complete search history.

(56) References Cited

U.S. PATENT DOCUMENTS

| | | | | |
|---|---|---|---|---|
| 6,023,539 A * | 2/2000 | Ohnami et al. | ............... | 382/317 |
| 2003/0020821 A1 * | 1/2003 | Watanabe et al. | ............. | 348/312 |
| 2003/0025823 A1 * | 2/2003 | Watanabe et al. | ............. | 348/372 |
| 2004/0130654 A1 * | 7/2004 | Ryu | ................. | 348/371 |
| 2004/0218088 A1 * | 11/2004 | Borg et al. | .................... | 348/362 |
| 2007/0001103 A1 * | 1/2007 | LaBelle | ................. | 250/214 SW |
| 2008/0100272 A1 | 5/2008 | Yoshio | | |
| 2010/0079649 A1 * | 4/2010 | Ayraud | .......................... | 348/308 |

FOREIGN PATENT DOCUMENTS

| | | |
|---|---|---|
| JP | 2001-339630 | 12/2001 |
| JP | 2007-221205 | 8/2007 |
| JP | 2008-99370 | 4/2008 |
| JP | 4311687 | 5/2009 |
| JP | 2010-74415 | 4/2010 |

* cited by examiner

*Primary Examiner* — Nelson D. Hernández Hernández
*Assistant Examiner* — Dennis Hogue
(74) *Attorney, Agent, or Firm* — Oblon, Spivak, McClelland, Maier & Neustadt, L.L.P.

(57) ABSTRACT

An imaging apparatus includes: a power supply; a first voltage converter producing first and second voltages which are different from each other based on an output of the power supply and outputting them to first and second output systems, respectively; a second voltage converter producing the first voltage based on the second voltage and outputting the first voltage to a third output system; an imaging element operated by the first voltage; at least one circuit element operated by at least one of the first and second voltages; a sensitivity setting section setting an input sensitivity of the imaging element based on at least one of a user's operation and information of a photographic subject; and a power supply switching section switching to supply the first voltage of the first output system to the imaging element in the case where the input sensitivity is lower than a predetermined sensitivity and switching to supply the first voltage which is outputted from the third output system to the imaging element in the case where the input sensitivity is higher than the predetermined sensitivity.

12 Claims, 7 Drawing Sheets

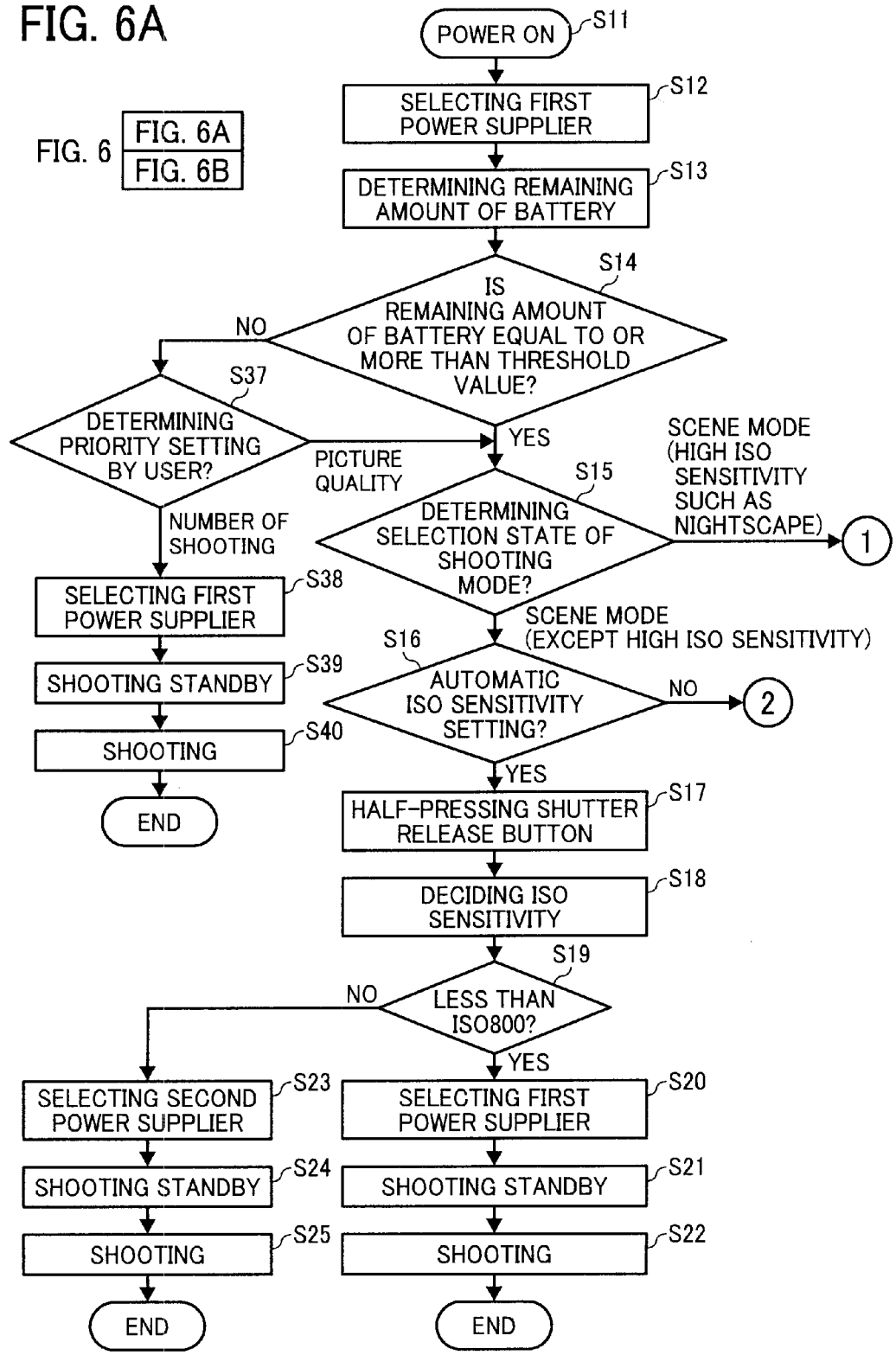

IMAGING APPARATUS HAVING ADJUSTABLE POWER SUPPLY BASED ON IMAGER SENSITIVITY

CROSS-REFERENCE TO RELATED APPLICATION

The present application is based on and claims priority from Japanese patent application number 2009-203183, filed Sep. 2, 2009, the disclosure of which is hereby incorporated by reference herein its entirety.

BACKGROUND

The present invention relates to an imaging apparatus like a so-called digital camera in which an imaging element or the like is driven by a power supply such as a battery and so on, and in particular, relates to an imaging apparatus in which a drive power supply system of the imaging element has been improved.

An imaging apparatus, such as a so-called digital camera, in which an image of a photographic subject is imaged by a solid-state imaging element, for example, a CMOS (complementary metal-oxide semiconductor) imaging element or a CCD (charge-coupled device) imaging element, and image data of a still image or a moving image of the photographic subject is obtained and digitally recorded in a recording medium such as memory and so on, is widely used. In such an imaging apparatus, a battery is generally used as a power supply, and a battery voltage is converted to a required voltage by a DC-DC converter of a switching regulator type and so on, and each part of the apparatus is driven. Therefore, in order to effectively use a battery as a power supply over a long term, it is preferable to achieve power saving. In addition, as for an imaging apparatus, high sensitivity and a high picture quality have been demanded, and in order to obtain a favorable shot image quality with less noise even in the case of high sensitivity, an imaging element which is hardly affected by noise has been also demanded even in the case of high sensitivity.

Conventionally, there are techniques to provide power saving and low noise of an imaging apparatus and so on, which are disclosed in Japanese patent publication numbers 2008-99370, 2007-221205, and 2001-339630, for example.

In Japanese patent publication number 2008-99370, a battery device using a power supply circuit with low noise and small power consumption is disclosed. In Japanese patent publication number 2008-99370, in a case where a voltage VDD is higher than a predetermined voltage, a configuration with a charge pump circuit which operates in a step down ratio=2 and steps down the voltage VDD and outputs an intermediate voltage is disclosed. Since the voltage VDD is stepped down by the above charge pump circuit, the intermediate voltage becomes approximately half of that in a case where the intermediate voltage is not stepped down, and power consumption is greatly reduced by an MOS transistor. Due to such a configuration, it is possible to inhibit an increase of power consumption by the voltage VDD with a high voltage, and this inhibition of power consumption makes it possible to minimize or eliminate a heat dissipating section. That is, Japanese patent publication number 2008-99370 discloses that a threshold value is set for a power supply voltage, and a step-down operation of the power supply voltage by the charge pump circuit is controlled, and a power saving operation is performed, and which makes the life of a battery as a power supply longer and inhibits noise due to the power supply.

In Japanese patent publication number 2007-221205, an imaging apparatus in which power consumption at the start of operation of the imaging apparatus is reduced so as not to interfere with a shooting, and which is capable of performing a long-time shooting by a battery is disclosed. Japanese patent publication number 2007-221205 discloses that an imaging apparatus, including at least two circuit units, and a power supply unit which supplies electric power individually to the circuit units, has a start-up mode judging section which judges a start-up mode based on a usage state of the imaging apparatus, and a power supply controlling section which controls an electric power supply from the power supply unit to the circuit units, and the start-up mode judging section judges at least two start-up modes depending on a usage state of the imaging apparatus when shooting. That is, Japanese patent publication number 2007-221205 discloses that at least two start-up modes are determined by the start-up mode judging section depending on a usage state of the imaging apparatus when shooting, and following the procedure by the start-up mode judging section, an electric power supply from the power supply unit to the circuit units is controlled by the power supply controlling section, and thereby power saving is performed, which increases the life of a battery.

Japanese patent publication number 2001-339630 discloses an imaging apparatus which effectively uses a battery by setting or permitting a proper operation mode depending on a remaining amount of battery power. Japanese patent publication number 2001-339630 discloses that an imaging apparatus capable of being driven by a battery predicts power consumption in various operation modes, and judges whether the battery is capable of supplying enough electric power to perform various operation modes or not based on the predicted power consumption, and then executes or permits an operation mode which has been judged that the battery is capable of supplying enough electric power to perform the operation mode. That is, Japanese patent publication number 2001-339630 discloses that by predicting power consumption per operation mode and changing an operation method, power saving is performed, which increases the life of a battery.

[Obvious Appearance of Noise Due to High Sensitivity]

By the way, an imaging apparatus using an imaging element like a so-called digital camera and so on is capable of adjusting and setting the sensitivity of the imaging element by a gain adjustment of the imaging element, and in many cases, it is possible to adjust and set the sensitivity as ISO (international organization for standardization) sensitivity corresponding to ISO sensitivity of a traditional silver halide film, for example. As for ISO sensitivity, for example, there typically are such values as ISO100, ISO200, ISO400, ISO800, ISO1600, and so on, and ISO100 is taken as a reference, and values which increase in geometric progression such as 200, 400, 800, 1600, and etc. are used. For example, at ISO200, shooting with a half amount of light at ISO100 is possible, because the light-receiving sensitivity is twice the ISO100.

As a value of ISO sensitivity increases, light-receiving sensitivity increases; therefore it is possible to shoot a dark photographic subject, and make a shutter speed faster, and shoot a photographic subject moving at high-speed with less shake. On the other hand, increasing the light-receiving sensitivity by an increase of the value of ISO sensitivity makes a gain of the imaging element higher; therefore noise in an image to be imaged can be highly visible. Accordingly, a small noise component which is negligible at low ISO sensitivity appears prominently in an image as an imaging result, when high ISO sensitivity is selected. As such noise components, there are fixed pattern noise, random noise, power supply noise (noise occurring in power supply affects an internal circuit and the like of an imaging element and appears as noise in an imaged image.) and so on.

[Noise Contamination Accompanied with Miniaturization]

In recent years, miniaturization of an imaging apparatus, for example, making a digital camera smaller and thinner, has advanced. Therefore, miniaturization of the imaging apparatus is performed by reducing a size of a component used inside the imaging apparatus, and encouraging a commonalization of a circuit in order to make the imaging apparatus smaller. As for commonalizing a circuit, for example, there are commonalizing a ground pattern (GND) in an analog circuit and in a digital circuit, commonalizing a power supply of each part, and so on. Due to performing a commonalization of a power supply and a commonalization of a ground pattern as described above, a noise current occurring in a circuit may flow to a different circuit via the commonalized ground pattern and power supply. Thus, generally, noise due to noise contamination occurring in a different circuit may appear in a power supply line.

[Shooting Amount/Battery]

As one of the important factors of an imaging apparatus such as a digital camera, there is a shooting amount (imaging amount), that is, the number of shootings (the number of shot images) in the case of a still image, or a shooting time (imaging time) in the case of a moving image. This shooting amount is an important factor next to an imaging quality regarding a specification of an imaging apparatus, and as for an imaging apparatus, obtaining a high picture quality and a great number of shootings at the same time is a main theme. As described above, since miniaturization of an imaging apparatus has been demanded recently, the size of a battery also has become smaller, and therefore it is not easy to increase the capacity of a battery. In addition, as for an imaging apparatus, there is a tendency of an increase of power consumption due to an increase of the number of imaging pixels, an increase of a size of a liquid crystal display device, a complex and a high-speed flash emission and lens operation, and so on, and it is not easy to maintain and improve the number of shootings for a battery (unused battery or fully-charged battery). And therefore, there is a problem such that the number of shootings for the battery has to be reduced.

[Noise Contamination Due to Types of Imaging Element]

Generally, as imaging elements, solid-state imaging elements such as a CCD (charge-coupled device) image sensor and a CMOS (complementary metal-oxide semiconductor) image sensor are widely used. As for the CCD image sensor, an analog signal line to an A/D (analog-digital) converter is long, and on the contrary, as for the CMOS image sensor, the analog signal line to the A/D converter is short; therefore there is a characteristic such that the CMOS image sensor is hardly affected by external noise. However, the structure of the CMOS image sensor is such that an imaging section and an analog front end section (AFE) are incorporated, and there are many cases where a common power supply is used for power supply of a circuit section which operates inside the CMOS image sensor. As for a peripheral circuit of the CMOS image sensor, an individual provision of a power supply (for example, a power supply is individually provided with a ground pattern (GND) in an analog circuit and a ground pattern (GND) in a digital circuit, and/or a power supply is not commonalized, but is individually provided with a plurality of parts where the same power supply voltage is used, and so on.) is ideal; however there are many cases where the power supply is commonalized and designed due to miniaturization.

SUMMARY

As described above, in an imaging apparatus such as a digital camera or the like in recent years, a solution or moderation of an obvious appearance of noise due to high sensitivity of an imaging element, noise contamination due to miniaturization, a limitation of the number of shootings for a battery, noise contamination due to types of imaging elements and so on has been required, however techniques disclosed in the above Japanese patent publication numbers 2008-99370, 2007-221205, and 2001-339630 do not go much beyond power saving. Therefore, the techniques disclosed in the above Japanese patent publication numbers 2008-99370, 2007-221205, and 2001-339630 do not make it possible to effectively solve or moderate important problems of a recent imaging apparatus, that is, problems of the obvious appearance of noise due to high sensitivity of the imaging element, the noise contamination due to miniaturization, the limitation of the number of shootings for the battery, the noise contamination due to types of imaging elements and so on.

An object of the present invention is to provide an imaging apparatus which is capable of effectively solving or moderating problems of the obvious appearance of noise due to high sensitivity of the imaging elements, the noise contamination due to miniaturization, the limitation of the number of shootings for the battery, the noise contamination due to types of imaging elements and so on.

In order to achieve the above object, an embodiment of the present invention provides: an imaging apparatus comprising: a power supply; a first voltage converter which produces a first voltage and a second voltage which are different from each other, based on an output of the power supply, and outputs them to a first output system and a second output system, respectively; a second voltage converter which produces the first voltage based on the second voltage produced by the first voltage converter and outputted to the second output system, and outputs the first voltage to a third output system; an imaging element which is operated by the first voltage as a power supply voltage, and photoelectrically-converts an optical image of a photographic subject and obtains image data; at least one circuit element which is operated by at least one of the first voltage and the second voltage as a power supply voltage; a sensitivity setting section which sets an input sensitivity of the imaging element based on at least one of a user's operation and information of the photographic subject; and a power supply switching section which switches to supply the first voltage of the first output system to the imaging element in the case where the input sensitivity set by the sensitivity setting section is lower than a predetermined sensitivity, and switches to supply the first voltage which is outputted from the third output system to the imaging element in the case where the input sensitivity set by the sensitivity setting section is higher than the predetermined sensitivity, wherein in the case where the input sensitivity set by the sensitivity setting section is low, the imaging element is driven by the first voltage from the first output system, and in the case where the input sensitivity set by the sensitivity setting section is high, the imaging element is driven by the first voltage from the third output system.

In order to achieve the above object, an embodiment of the present invention provides: an imaging apparatus comprising: a power supply including a battery; a first voltage converter which produces a first voltage and a second voltage higher than the first voltage which are different from each other, based on an output of the power supply, and outputs them to a first output system and a second output system, respectively; a second voltage converter including a step-down regulator which steps down and stabilizes the second voltage produced by the first voltage converter and outputted to the second output system to produce the first voltage, and outputs the first voltage to a third output system; an imaging element which is operated by the first voltage as a power supply voltage, and photoelectrically-converts an optical image of a photographic subject to obtain image data; at least one circuit element which is operated by at least one of the first voltage and the second voltage as a power supply voltage; and a power supply switching section which selectively switches to supply the first voltage of the first output system to the imaging element, or to supply the first voltage outputted from the third output system to the imaging element, based on at least one of a state of the imaging apparatus and a shooting condition of a photographic subject, wherein the first voltage from the first output system and the first voltage from the third output system are selectively switched to drive the imaging element.

BRIEF DESCRIPTION OF THE DRAWINGS

FIG. 6A is a first section of a flow chart explaining a main operation of the digital camera of FIG. 1 using the power supply system of FIG. 5.

DETAILED DESCRIPTION OF THE PREFERRED EMBODIMENT

Figure 1:
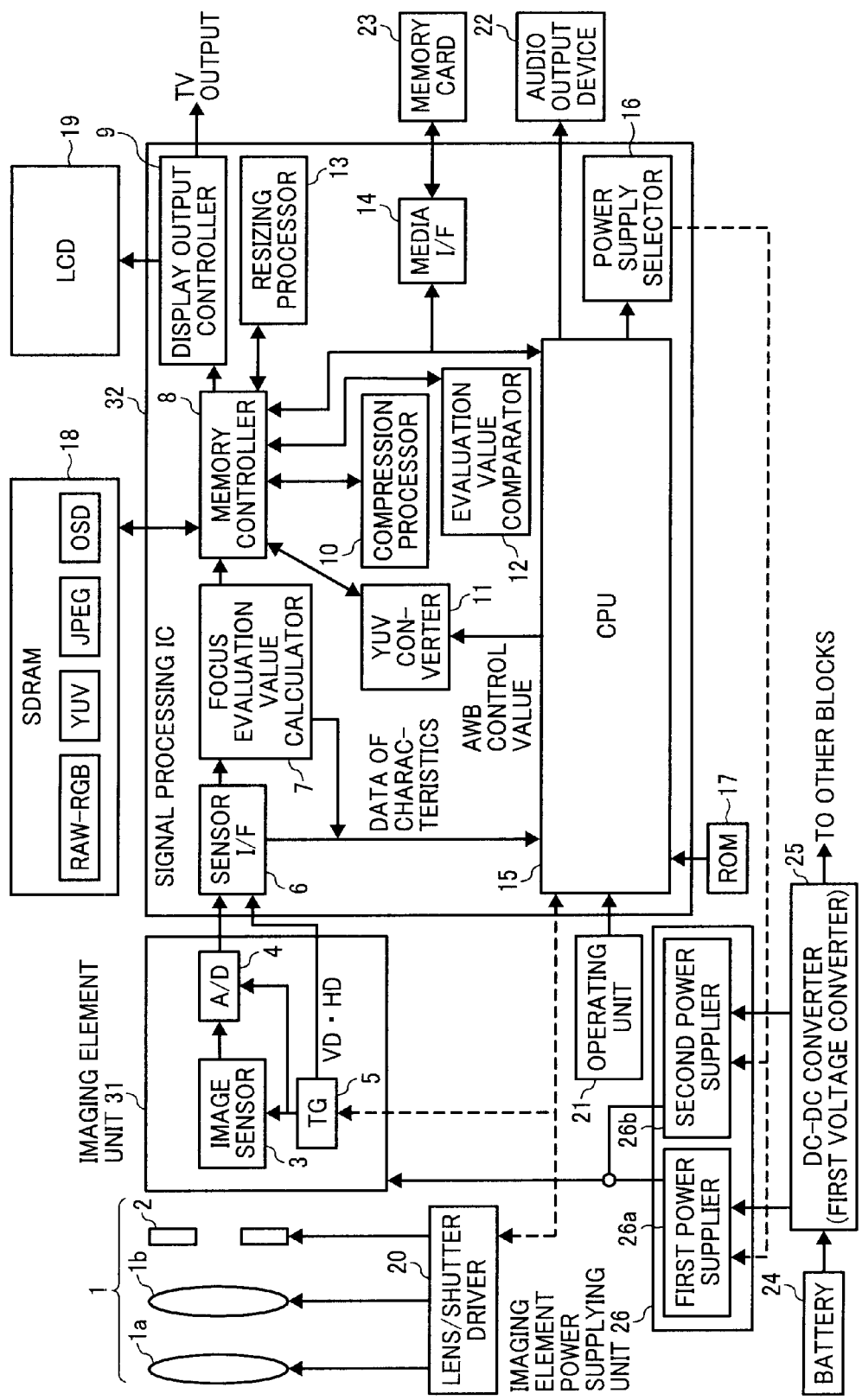
FIG. 1 is a block diagram illustrating a schematic system configuration of a digital camera according to an embodiment of an imaging apparatus of the present invention.
Figure 2:
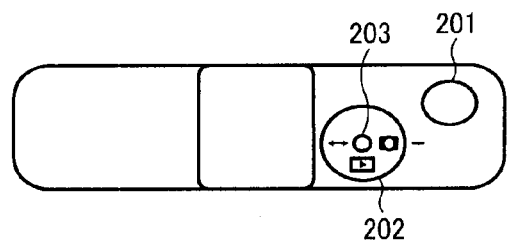
FIG. 2 is a top view schematically illustrating an external structure of the digital camera of FIG. 1.
Figure 3:
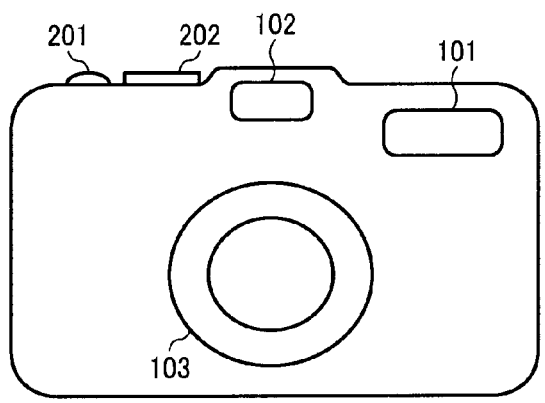
FIG. 3 is a front view schematically illustrating the external structure of the digital camera of FIG. 2.
Figure 4:
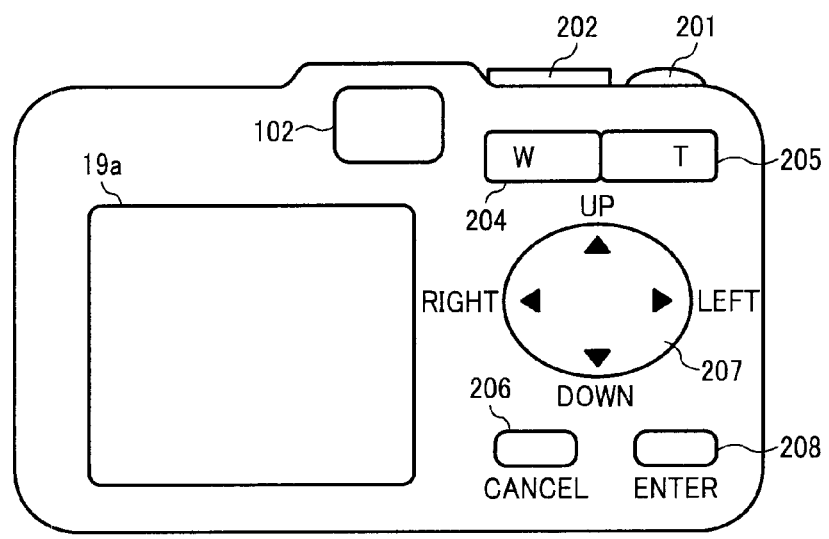
FIG. 4 is a back view schematically illustrating the external structure of the digital camera of FIG. 2.

Hereinafter, based on an embodiment of the present invention, with reference to drawings, an imaging apparatus of the embodiment of the present invention will be explained in detail. In FIGS. 1 to 4, a structure of a digital camera to which the imaging apparatus according to the embodiment of the present invention is applied is illustrated. In recent years, there have been a great number of digital still cameras having a moving image imaging function, digital video cameras (movie camera) having a still image shooting function, and so on. Here, the imaging apparatus which is simply called a digital camera, and mainly the case where a still picture is taken will be described. FIG. 1 is a block diagram illustrating a whole system configuration of a digital camera as an imaging apparatus, and FIGS. 2 to 4 are a top view, a front view and a back view illustrating schematically an external structure of the digital camera of FIG. 1, respectively.

The digital camera illustrated in FIG. 1 includes an imaging lens 1, a mechanical shutter 2, an image sensor 3, an A/D (analog-digital) converter 4, a timing generator (TG) 5, a sensor interface (sensor I/F) 6, a focus evaluation value calculator 7, a memory controller 8, a display output controller 9, a compression processor 10, a YUV converter 11, an evaluation value comparator 12, a resizing processor 13, a media interface (media I/F) 14, a CPU (central processing unit) 15, a power supply selector 16, a ROM (read-only memory) 17, a frame memory (SDRAM) 18, a liquid crystal display (LCD) 19, a lens/shutter driver 20, an operating unit 21, an audio output device 22, a memory card 23, a battery 24, a DC-DC converter 25, and a power supplying unit for an imaging element (imaging element power supplying unit) 26. The imaging lens 1 includes a zooming lens 1a, a focusing lens 1b, and so on. An imaging element unit 31 includes the image sensor 3, the A/D converter 4, and the timing generator 5. A signal processing IC (integrated circuit) 32 is equipped with the sensor interface 6, the focus evaluation value calculator 7, the memory controller 8, the display output controller 9, the compression processor 10, the YUV converter 11, the evaluation value comparator 12, the resizing processor 13, the media interface 14, the CPU 15, and the power supply selector 16.

The imaging lens 1 is an optical system to form an optical image of a photographic subject on a light receiving surface of the image sensor 3 as an imaging element. In this case, the imaging lens 1 is configured as a zoom lens, and at least a part of the imaging lens 1 is configured as the zooming lens 1a for a zooming operation, and at least a part of the imaging lens 1 is configured as the focusing lens 1b for a focusing operation. The mechanical shutter 2 is disposed inside the imaging lens 1 or disposed on a light path between the imaging lens 1 and the image sensor 3, and opens and closes the light path, and regulates exposure of the image sensor 3.

The imaging element unit 31 including the image sensor 3, the A/D converter 4, and the timing generator 5 functions as a front end which processes an imaging output signal of the image sensor 3. The image sensor 3 includes a CMOS (complementary metal-oxide semiconductor) solid-state imaging element using a light receiving element of a CMOS type, or a CCD (charge-coupled device) solid-state imaging element using a light receiving element of a CCD type. Additionally, when needed, the image sensor 3 includes a CDS (correlated double sampling) circuit which performs a correlated double sampling on an output image signal of the light receiving element, an AGC (automatic gain control) circuit which performs an automatic gain control on a correlated double sampling output of the CDS circuit to adjust to a required signal level, and so on.

The image sensor 3 as an imaging element converts an optical image incident onto a light receiving surface in an exposure state to an electric signal and maintains it temporarily, and transfers and outputs image data. The A/D converter 4 converts an analog output of the image sensor 3 to digital data. The timing generator 5 sends a VD signal (vertical synchronizing drive signal) and a HD signal (horizontal synchronizing drive signal), which are synchronizing drive signals, to the sensor interface 6 of the signal processing IC 32 in cooperation with the CPU 15, and sends a timing signal to the image sensor 3 and the A/D converter 4, and thereby the image sensor 3 and A/D converter 4 are properly synchronized.

Based on control of the CPU 15, the signal processing IC 32 stores digital image data converted by the A/D converter 4 of the imaging element unit 31 in the frame memory 18, and performs required signal operations of compression, YUV conversion and so on, and performs operations of storing data which is processed in the signal processing IC 32 in the frame memory 18, displaying image data and the like sent from the A/D converter 4 or taken from the frame memory 18 on the LCD 19, compressing, YUV-converting, and resizing of digital image data sent from the A/D converter 4 or taken from the frame memory 18, storing digital image data taken from the frame memory 18 in the memory card 23 via the media interface 14, and so on.

That is, the sensor interface 6 receives digital image data sent from the A/D converter 4 of the imaging element unit 31, and sends it to the memory controller 8 via the focus evaluation value calculator 7. The memory controller 8 stores the sent digital data in the frame memory 18. The focus evaluation value calculator 7, for example, at the same time as an operation of storing the digital image data from the sensor interface 6 in the frame memory 18, calculates a focus evaluation value.

A calculation of the focus evaluation value is performed by, for example, firstly, applying a predetermined spatial band-pass filter of a horizontal scanning direction in each line which is a target, and selecting data in which an absolute value of a band-pass filter output is maximum, per line, and integrating the selected data in a vertical scanning direction. By such an operation, it is possible to obtain a focus evaluation value which becomes maximum in an in-focus state and becomes smaller in an out-of-focus state. Or, for example, the calculation of the focus evaluation value can be performed by dividing image data into (n×m) divided areas and obtaining a focus evaluation value of each of the divided areas. A calculation method of the focus evaluation value is not limited to the above-described examples, and any method which gives a focus evaluation value that expresses a focus state by a magnitude of the value can be performed.

The memory controller 8, based on control of the CPU 15, controls writing RAW-RGB data of a natural image which is sent via the sensor interface 6 and the focus evaluation value calculator 7, YUV data which is converted by the YUV converter 11 from the RAW-RGB data to the YUV data including brightness information Y, color difference information U (Cb: (B−Y)×constant), and color difference information V (Cr: (R−Y)×constant), JPEG (joint photographic experts group) data which is compressed in JPEG format, for example, in the compression processor 10, OSD (on-screen display) image data for displaying shooting mode icons and the like, and so on in the frame memory 18, and reading out the above from the frame memory 18. The display output controller 9 displays the image data read from the frame memory 18 on the LCD 19, and outputs a TV (television) output for displaying on an external TV and so on. The compression processor 10 compresses image data sent from the A/D converter 4 or taken from the frame memory 18 and the like in a predetermined compression format such as JPEG format. The YUV converter 11 converts the image data sent from the A/D converter 4 or taken from the frame memory 18 to YUV data based on an auto white balance (AWB) control value sent from the CPU 15. The evaluation value comparator 12 compares a focus evaluation value calculated by the focus evaluation value calculator 7 with a threshold value stored in the ROM 17 and the like beforehand, and judges whether an image of the image data is an in-focus image having a focus evaluation value which is equal to more than the threshold value or an out-of-focus image having a focus evaluation value which is less than the threshold value. The resizing processor 13 resizes the image data sent from the A/D converter 4 or taken from the frame memory 18 to a different size.

The media interface 14 writes the image data sent from the A/D converter 4 or taken from the frame memory 18 in the memory card 23 based on control of the memory controller 8 and the CPU 15. That is, the memory controller 8 stores image data sent from the A/D converter 4 in the frame memory 18, and takes out image data from the frame memory 18, and displays it on the LCD 19 via the display output controller 9, and the memory controller 8 takes out image data from the frame memory 18, and performs compression in JPEG format and the like by the compression processor 10, YUV conversion by the YUV converter 11, and resizing by the resizing processor 13, and writes data after performing these compression, YUV conversion, and resizing in the frame memory 18, and additionally takes out data from the frame memory 18 and writes the data in the memory card 23.

An operation program, data, and the like of the CPU 15 are stored in the ROM 17. The CPU 15 executes various operations regarding a shooting operation based on the program and data read out from the ROM 17. The frame memory 18 includes a semiconductor memory, for example, an SDRAM (synchronous random access memory) and the like, and stores each of RAW-RGB data, YUV data, JPEG data, OSD image data, and so on.

The LCD 19 displays information of the image data or the like which is supplied from the A/D converter 4 or taken from the frame memory 18 and then outputted via the display output controller 9.

The lens/shutter driver 20 drives the zooming lens 1a, the focusing lens 1b, and the like, respectively, for zooming, focusing and the like of the imaging lens 1 by a lens drive motor (not illustrated) based on control of the CPU 15. Additionally, the lens/shutter driver 20 drives the mechanical shutter 2 for opening and closing operations of the shutter by a shutter drive motor (not illustrated) in cooperation with the timing generator 5.

The operating unit 21 includes a shutter release button for giving an instruction of shooting, a mode dial for switching operation modes of a digital camera, and at least a part of the operating unit of other switches, keys, levers, dials, and the like, and performs operations for giving information of operation instruction, setting instruction, selection instruction and the like for the digital camera to the CPU 15. The audio output device 22 sounds an alarm, an audio message and the like. The memory card 32 is a compact IC memory type recording medium with a built-in semiconductor nonvolatile memory such as so-called flash memory, and is used as an external recording medium which is detachable for the digital camera. For example, based on control of the CPU 15, image data compressed in JPEG format or the like stored in the frame memory 18 is taken from the frame memory 18 via the memory controller 8, and the image data is stored in the memory card 23 as a shooting result.

The DC-DC converter 25 constitutes a first voltage converter. The DC-DC converter 25 obtains a first voltage (for example, 1.8V), and a second voltage (for example, 3.1V), in this case, which is higher than the first voltage, from an output voltage of the battery 24 as a power supply, and respectively supplies the first voltage and the second voltage to a first power supplier 26a and a second power supplier 26b of the imaging element power supplying unit 26, and supplies electric power to other circuit element parts. The first power supplier 26a of the imaging element power supplying unit 26 directly outputs the given first voltage. On the other hand, the second power supplier 26b includes a second voltage converter which steps down the given second voltage to convert to a first voltage which is equal to the first voltage of the first power supplier 26a, and outputs the first voltage which is stepped down from the second voltage by this second voltage converter. The imaging element power supplying unit 26 selectively supplies either an output of the first power supplier 26a or an output of the second power supplier 26b to the imaging element unit 31. The power supply selector 16 judges whether either the first power supplier 26a or the second power supplier 26b of the imaging element power supplying unit 26 supplies electric power to the imaging element unit 31, based on setting states of sensitivity such as ISO sensitivity of the CPU 15 and a shooting mode such as scene modes, and conditions of a photographic subject such as brightness of the photographic subject, an opening degree of an aperture, and with or without a flash emission. This power supply system for the imaging element unit 31 will be described in detail later.

In FIGS. 2 to 4, on the back surface of a body of the digital camera, an LCD 19a is disposed. This LCD 19a comprises the LCD 19 in FIG. 1. The LCD 19a displays various situations regarding an image and imaging. As the LCD 19, in addition to the LCD 19a, there is also a case where a sub LCD for mainly displaying various symbols expressing a film counter, date/time and an operation state is provided. In the case where the sub LCD is not provided, information such as the various symbols expressing the film counter, date/time and operation state is also displayed on the LCD 19a.

On the top surface of the body, a shutter release button 201 and a mode dial 202 are disposed. The mode dial 202 is used for switching of shooting/playback operation modes and selecting a scene mode when shooting. In the center of the mode dial, a power button 203 for turning a power-supply switch on/off is disposed.

On the back surface of the body, a wide-angle side (WIDE) zoom button 204, a telephoto side (TELE) zoom button 205, a menu button 206, an up (UP)/down (DOWN)/left (LEFT)/right (RIGHT) button 207, and an okay (OK) button 208 are disposed. And the operating unit 21 includes each of the above buttons and dial.

On the front surface of the body, a flash emission section 101, an object plane of an optical viewfinder 102, a lens barrel unit 103 of a shooting lens, and so on are disposed. And in addition, on the back surface of the body, an eye-piece of the optical viewfinder 102 is disposed.

By controlling each part as described above by the CPU 15 and so on, various functions such as an auto focus function in which the focusing lens 1b is automatically focused on a photographic subject, a so-called focus bracketing shooting function in which the focusing lens 1b is moved and shootings are serially performed at a plurality of in-focus positions in a predetermined target distance range, and so on are carried out. And when focus bracketing shooting, as for the plurality of images shot serially, making a comparison between the focus evaluation value calculated by the focus evaluation value calculator 7 and the threshold value stored in the ROM 17 and the like beforehand by the evaluation value comparator 12, and a selection of acceptable images can be performed such that only in-focus images having the focus evaluation value which is equal to more than the threshold value are taken as the acceptable images, and out-of-focus images having the focus evaluation value which is less than the threshold value are distinguished as unacceptable candidate images.

In the above-described configuration, firstly, an operation overview of this conventional type digital camera will be explained.

By operating the mode dial 202 illustrated in FIG. 2 of the operating unit 21 of FIG. 1, and setting an operation mode to a shooting mode, and pressing the power button 203, power supply of this digital camera is thrown, and the digital camera is started in the shooting mode. The mode dial 202 and the power button 203 are included in the operating unit 21 of FIG. 1, and when the CPU 15 detects that the power button 203 is turned on in a state where a state of the mode dial 202 is the shooting mode, the CPU 15 controls the lens/shutter driver 20 to move a required lens group of the imaging lens 1 in the lens barrel unit 103 to a photographable position. In addition, electric power of a power supply is supplied to each part of the imaging element unit 31, the LCD 19, and so on, and operation starts.

When electric power of a power supply is supplied to each of the above-described parts, a monitoring (live-view) mode operation is started. In this monitoring mode, an optical image of a photographic subject formed by the imaging lens 1 is incident onto an input surface of the image sensor 3 using, for example, a CMOS image sensor, and converted to an electric signal by the image sensor 3 and sent to the A/D converter 4. This electric signal is converted to a digital signal by the A/D converter 4, and sent to the signal processing IC 32 as a digital signal in RAW-RGB format. The digital signal in RAW-RGB format is introduced to the signal processing IC 32 by the sensor interface 6, and written in the frame memory 18 by the memory controller 8 via the focus evaluation value calculator 7. Additionally, this digital signal in RAW-RGB format is converted to a YUV signal, which is a displayable format, by the YUV converter 11 in the signal processing IC 32, and written in the frame memory 18 by the memory controller 8. This YUV signal is read out by the memory controller 8, and via the display output controller 9, outputted as a TV output or sent to the LCD 19, and displayed on the LCD 19a. Such an operation is generally performed at ⅟30-second intervals, and renewed per ⅟30 second. This is a display operation of the monitoring mode.

In this case, if the image sensor 3 is an 8M-pixel CMOS image sensor, for example, whole pixels are outputted per ⅟30 second when still picture shooting. In the case of the monitoring mode, addition and thinning-out of neighborhood pixels are performed, and, for example, the number of pixels are reduced to 640×480 pixels and the pixels are outputted per ⅟30 second.

In the sensor interface 6 of the signal processing IC 32, a digital RGB signal loaded in the sensor interface 6 is supplied to the focus evaluation value calculator 7 in order to transfer to the memory controller 8 and calculate a focus evaluation value which indicates a focus level of an image. The focus evaluation value calculator 7 transfers the digital RGB signal sent from the sensor interface 6 directly to the memory controller 8, and calculates the focus evaluation value based on the digital RGB signal. The focus evaluation value is created from, for example, an output integral value of a high-frequency component extraction filter and an integral value of the brightness difference of neighborhood pixels. In the case of an in-focus state, an edge part of a photographic subject is sharp; therefore there are many high-frequency components in an image, and in a graph where a horizontal axis expresses a frequency and a vertical axis expresses a component amount, the high-frequency component shows a sharp peak. When a focus detection operation by an AF (auto focus) control is performed, by use of the above characteristics, focus evaluation values in the case where the focusing lens 1b of the imaging lens 1 is in various positions are obtained, and the position where the focus evaluation value becomes maximum is taken as an in-focus position, and the AF control is performed.

In the signal processing IC 32 of the sensor interface 6, based on the digital RGB signal loaded in the sensor interface 6, an AE (auto exposure) evaluation value which is information for detecting the brightness of a photographic subject, and an AWB (auto white balance) evaluation value which is information for detecting colors of a photographic subject are calculated. Data of these AE evaluation value and AWB evaluation value are read out as data of characteristics with the focus evaluation value obtained by the focus evaluation value calculator 7 by the CPU 15, and each is used for operations of an AE control, an AWB control, and the AF control, respectively.

The AE evaluation value and the AWB evaluation value are created from each integral value of R (red), G (green), and B (blue) signals. For example, an image planes is equally divided into 256 areas (horizontal: 16 divided areas, vertical: 16 divided areas), and an RGB integrated value of each area, that is, an RGB integral value is calculated. The CPU 15 reads out the RGB integral value, and in the case of the AE control, the brightness of each area is calculated, and a proper exposure time as a control value of the AE control is determined from brightness distribution. And in the case of the AWB control, based on distribution of R, G, and B signals, a control value of the AWB control corresponding to a color of a light source is determined. These AE operation and AWB operation are repeated serially during the monitoring mode.

When the shutter release button 201 of FIGS. 2 to 4 is operated, the AF operation for detecting an in-focus position and a still image recording operation are performed. That is, when the shutter release button 201 is pressed, a signal to start a still image shooting is outputted from the operating unit 21 of FIG. 1 and loaded in the CPU 15, and the CPU 15 drives the focusing lens 1b of the imaging lens 1 in synchronization with a frame rate via the lens/shutter driver 20, and thereby a so-called hill-climbing AF control is performed. In the case where an AF target range is an entire range from infinity to a closest position, the focusing lens 1b gradually moves to each of points set beforehand (in-focus candidate positions) from the closest position to infinity or from infinity to the closest position, and a focus evaluation value in each of the points set beforehand calculated by the focus evaluation value calculator 7 in the signal processing IC 32 is read out by the CPU 15. And a point of the points set beforehand where the focus evaluation value becomes maximum is taken as an in-focus position, and the focusing lens 1b is moved to the in-focus position. After completing the AF operation, an analog RGB signal outputted from the image sensor 3 is converted to a digital RGB signal by the A/D converter 4, and then stored in the frame memory 18 via the focus evaluation value calculator 7 and the memory controller 8 in the signal processing IC 32. The digital RGB signal is again read in the signal processing IC 32, and converted to YUV data, and then written back in the frame memory 18.

When imaging a still image, YUV-converted image data is sent to the compression processor 10, which includes an image compression and extension circuit and so on, in the signal processing IC 32. The YUV data sent to the compression processor 10 is compressed, and written back in the frame memory 18. The compressed data in the frame memory 18 is read out to the signal processing IC 32, and then stored in a memory medium for data recording such as the memory card 23.

Next, a detailed configuration of a power supply system for the imaging element unit 31, which is a characteristic of a digital camera according to an embodiment of an imaging apparatus of the present invention, will be explained with reference to FIG. 5.

Figure 5:
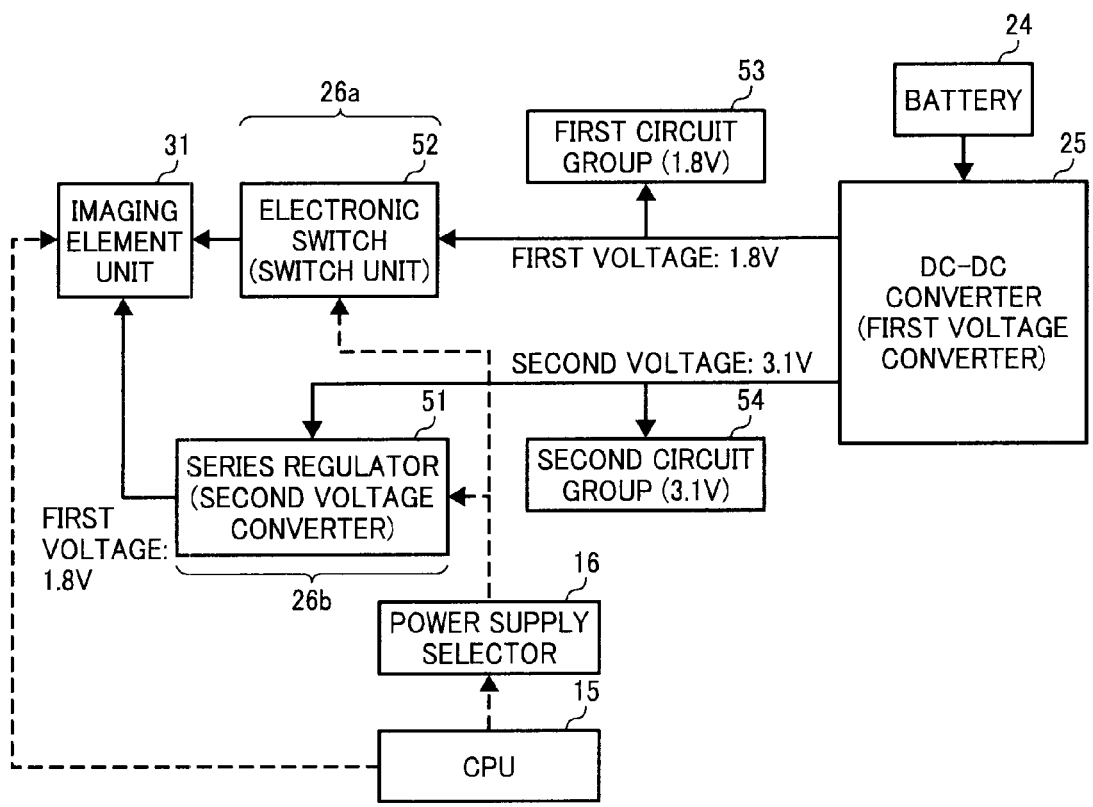
FIG. 5 is a block diagram illustrating a configuration of a power supply system for an imaging element and other electronic circuits of the digital camera of FIG. 1 according to an embodiment of the present invention.

A power supply system illustrated in FIG. 5 includes a series regulator 51, an electronic switch 52, a first circuit group 53, and a second circuit group 54 in addition to the battery 24 and the DC-DC converter 25 illustrated in FIG. 1.

That is, the supply of electric power from a power supply to the imaging element unit 31 by this power supply system is performed in the following way. An output of the battery 24 as a power supply is supplied to the DC-DC converter 25 as the first voltage converter. The DC-DC converter 25 converts the output of the battery 24 and produces the first voltage, for example, a voltage of 1.8V, and the second voltage which is higher than the first voltage, for example, a voltage of 3.1V, which are both usable as a power supply of the imaging element unit 31, and outputs the first and second voltages to a first output system and a second output system, respectively. The first output system of the voltage of 1.8V (first voltage) constitutes the first power supplier 26 which connects to a power supply input of the imaging element unit 31 via the electronic switch 52. The electronic switch 52 (switch unit) is a so-called load switch such as a MOSFET (metal-oxide semiconductor field-effect transistor) switch, and turns a power supply of the voltage of 1.8V (first voltage) from the first output system of the DC-DC converter 25 to the imaging element unit 31 on and off. The second output system of the voltage of 3.1V (second voltage) of the DC-DC converter 25 constitutes the second power supplier 26b which connects to a power supply input of the imaging element unit 31 via the series regulator 51 as the second voltage converter and a third output system, which is described later. The series regulator 51 is a kind of step-down regulator, and converts an output of 3.1V (second voltage) from the second output system of the DC-DC converter 25 to step down and stabilize to 1.8V (first voltage), and outputs it to the third output system. The third output system from the series regulator 51 connects to a power supply input of the imaging element unit 31 and supplies electric power from the power supply to the imaging element unit 31.

Preferably, the series regulator 51 is capable of performing an on/off control of the operation, and outputting a stabilized voltage of 1.8V (first voltage) only in a state of "on". Either the first power supplier 26a including the electronic switch 52 or the second power supplier 26b including the series regulator 51 is selectively activated and controlled to supply electric power to the imaging element unit 31 by the CPU 15 via the power supply selector 16. The CPU 15 and the power supply selector 16 function as a power supply switching section.

In the case where the series regulator 51 is not able to perform the on/off control of the operation by an external signal, an electronic switch similar to the electronic switch 52 can be inserted in the third output system. In this case, when electric power is not supplied to the imaging element unit 31 from the electronic switch 52, a circuit where a voltage supplied from the series regulator 51 is preferentially used and electric power is supplied to the imaging element unit 31 can be configured.

The voltage of 1.8V (first voltage) from the first output system of the DC-DC converter 25 is supplied to the first circuit group 53 including equal to or more than one circuit element operated by a power supply voltage of 1.8V (first voltage), and the first circuit group 53 is also driven. The voltage of 3.1V (second voltage) from the second output system of the DC-DC converter 25 is supplied to the second circuit group 54 including equal to or more than one circuit element operated by a power supply voltage of 3.1V (second voltage), and the second circuit group 54 is also driven.

Next, a characteristic operation of a digital camera according to an embodiment of the present invention will be explained specifically.

Figure 6B:
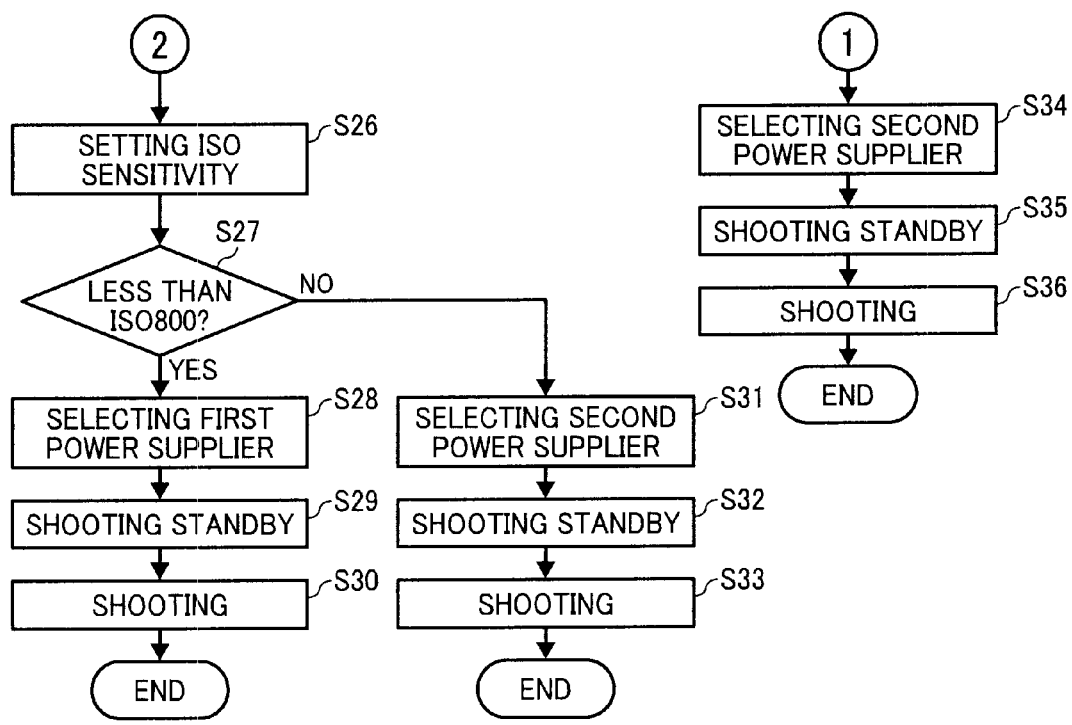
FIG. 6B is a second section of a flow chart explaining a main operation of the digital camera of FIG. 1 using the power supply system of FIG. 5.

Firstly, a main part of a shooting operation including control of a power supply for the imaging element unit 31, which is a characteristic operation of the embodiment of the present invention, will be explained with reference to an operation flow chart illustrated in FIGS. 6A and 6B.

Firstly, the power button 203 illustrated in FIG. 2 of the operating unit 21 of FIG. 1 is pressed, and thereby the power supply is thrown, and the digital camera is started and becomes a shooting state (Step S11). At this time, power supply which is supplied to the imaging element unit 31 including the image sensor 3 starts up in a state where the electronic switch 52 is turned on and the first power supplier 26a is selected (Step S12). The first power supplier 26a is a power supply system with low power consumption, and supplies an output of 1.8V (first voltage) of the DC-DC converter 25 to the imaging element unit 31 via the electronic switch 52 which is in the state of "on".

Next, the remaining amount of the battery 24 as a power supply is determined (Step S13), and if the remaining amount of the battery 24 is equal to or more than a threshold value which is set beforehand (Step S14), a selection state of a shooting mode by the mode dial 202 illustrated in FIG. 2 of the operating unit 21 of FIG. 1 is determined (Step S15). The CPU 15 functions as a remaining amount determining section.

A user selects and sets a shooting mode by operating the mode dial 202. The operation of selection and setting of the shooting mode by the mode dial 202 can be performed before the power is on in Step S11 such as at a previous shooting or the like, or just before the selection state is determined in Step S15. Therefore, in the case where the mode dial 202 is operated and the setting of the shooting mode is changed before shooting, at the time, the operation returns to Step S15, and the selection state of the shooting mode is determined.

As the shooting mode set by the mode dial 202, for example, there are an automatic shooting mode for an ordinary shooting, and a scene mode in which various setting conditions including input sensitivity (ISO sensitivity) of the imaging element are programmed based on various scenes of photographic subjects beforehand. As the scene mode, for example, there are a portrait mode, a face mode, sports mode, a portrait in a nightscape mode, a landscape mode, a nightscape mode, a high sensitivity mode, a zoom macro mode, a skew correction mode, a text mode, and so on. When a scene mode is selected by the mode dial 202, input sensitivity (ISO sensitivity) of the imaging element is set, therefore the mode dial 202 functions as a sensitivity setting section.

Here, main scene modes will be explained. The portrait mode is a scene mode which is optimized for shooting a portrait, and used for a portrait shooting. The face mode is a scene mode for shooting a face of a photographic subject finely and clearly, and in which a so-called face recognition function which automatically recognizes a face of a photographic subject is activated, and a focus (AF), exposure (AE), and white balance (AWB) are automatically adjusted based on the recognized face. The sports mode is a scene mode which is used for shooting a moving photographic subject such as sports shooting, and in which an automatic exposure condition to choose a shutter speed as fast as possible is programmed. The portrait in a nightscape mode is a scene mode which is optimized for shooting a person against a background of a nightscape, and in which a flash emits light automatically as supplemental light for a person. The landscape mode is a scene mode which is optimized for a long-distance shooting of a scenery which greatly has green forests and fields and/or blue sky, and used for shooting the scenery as above-described. The nightscape mode is a scene mode which is optimized for a nightscape shooting, and in which an automatic exposure condition to preferably choose a low-speed shutter is programmed, and used for shooting a nightscape. The high sensitivity mode is a scene mode which is optimized for a shooting in a place when and where it is darkish, and in which it is programmed such that high ISO sensitivity is selected and an automatic exposure is performed, and thereby it is easy to see a monitoring image displayed on the 19. The zoom macro mode is a scene mode which is a macro shooting mode in which a zoom position is automatically optimized, and it is programmed such that a photographic subject is shot more largely than in an ordinary macro shooting. The skew correction mode is a scene mode which is optimized for shooting quadrangular-shape photographic subjects such as a bulletin board, a business card, and a printed document, and in which even when shooting such photographic subjects from a skew direction, it is programmed such that a shot image is corrected as a front shot image and then converted. The text mode is a scene mode which is used, for example, for shooting text on a white board in a meeting room, and in which an image is binarized to black and white and then recorded.

In the portrait mode and the face mode of the above-described scene modes, there is a high possibility of comparatively largely shooting skin of a person as a photographic subject, a face in particular, therefore a shooting with less noise is preferable.

In Step S15, in the case where the shooting mode is determined to be not a scene mode of high ISO sensitivity such as a nightscape, the setting of ISO sensitivity is determined to be either automatic or not (Step S16). In Step S16, in the case where the setting of ISO sensitivity is determined to be automatic, the user targets a main part of a photographic subject, and then presses the shutter release button 201. In many cases, the shutter release button 201 is operated by a two-step operation, and in a first step of the two-step operation of the shutter release button 201, that is, when the shutter release button 201 is in a half-pressed state (Step S17), proper ISO sensitivity and a shutter speed are decided on the basis of the shooting mode of the set scene mode, brightness of the photographic subject and so on (Step S18).

Next, the selected ISO sensitivity is judged as to whether it is less than ISO800 or not (Step S19), and in the case where the ISO sensitivity is less than ISO800, the first power supplier 26a with low power consumption is selected as the power supply for the image sensor unit 31, and the electronic switch 52 is turned on, and an output of 1.8V (first voltage) of the DC-DC converter 25 is supplied to the imaging element unit 31 (Step S20), and the digital camera becomes a shooting standby state (Step S21). In the state of Step S21, when the user targets the main part of the photographic subject and performs a second step of the two-step operation of the shutter release button 201, that is, the shutter release button 201 is fully-pressed, and then a shooting is performed with low power consumption (Step S22).

In Step S19, in the case where the ISO sensitivity is judged to be not less than ISO800, the second power supplier 26b is selected as the power supply for the imaging element unit 31, and the electronic switch 52 is turned off, and an output of 3.1V (second voltage) of the DC-DC converter 25 is stepped down and stabilized to 1.8V (first voltage) by the series regulator 51, and electric power of the power supply which is less affected by noise is supplied to the imaging element unit 31 (Step S23), and the digital camera becomes a shooting standby state (Step S24). In the state of Step S24, when the user targets the main part of the photographic subject and performs a second step of the two-step operation of the shutter release button 201, that is, the shutter release button 201 is fully-pressed, and then a shooting is performed in a state where the power supply is less affected by noise (Step S25).

In Step S16, in the case where the setting of ISO sensitivity is determined to be not automatic, the user sets ISO sensitivity manually (by manual operation) by the operating unit 21 (equivalent to a sensitivity setting section), or already-set ISO sensitivity is confirmed (Step S26), and the selected ISO sensitivity is judged whether it is less than ISO800 or not (Step S27). In Step S27, in the case where the ISO sensitivity is less than ISO800, the first power supplier 26a with low power consumption is selected as the power supply for the imaging element unit 31, and the electronic switch 52 is turned on, and an output of 1.8V (first voltage) of the DC-DC converter 25 is supplied to the imaging element unit 31 (Step S28), and then the digital camera becomes a shooting standby state (Step S29). In the state of Step S29, when the user targets the main part of the photographic subject and performs a second step of the two-step operation of the shutter release button 201, that is, the shutter release button 201 is fully-pressed, and then a shooting is performed with low power consumption (Step S30).

In Step S27, in the case where the ISO sensitivity is judged to be not less than ISO800, the second power supplier 26b is selected as the power supply for the imaging element unit 31, and the electronic switch 52 is turned off, and an output of 3.1V (second voltage) of the DC-DC converter 25 is stepped down and stabilized to 1.8V (first voltage) by the series regulator 51, and electric power of the power supply which is less affected by noise is supplied to the imaging element unit 31 (Step S31), and the digital camera becomes a shooting standby state (Step S32). In the state of Step S32, when the user targets the main part of the photographic subject and performs a second step of the two-step operation of the shutter release button 201, that is, the shutter release button 201 is fully-pressed, and then a shooting is performed in a state where the power supply is less affected by noise (Step S33).

And in Step S15, in the case where the shooting mode is determined to be a high ISO sensitivity scene mode, that is, a scene mode in which high ISO sensitivity is set for a darkish scene such as a nightscape in which high ISO sensitivity is needed, the second power supplier 26b is selected as the power supply for the imaging element unit 31, and the electronic switch 52 is turned off, and an output of 3.1V (second voltage) of the DC-DC converter 25 is stepped down and stabilized to 1.8V (first voltage) by the series regulator 51, and electric power of the power supply which is less affected by noise is supplied to the imaging element unit 31 (Step S34), and the digital camera becomes a shooting standby state (Step S35). In the state of Step S35, when the user targets the main part of the photographic subject and performs a second step of the two-step operation of the shutter release button 201, that is, the shutter release button 201 is fully-pressed, and then a shooting is performed in a state where the power supply is less affected by noise (Step S36).

Figure 7:
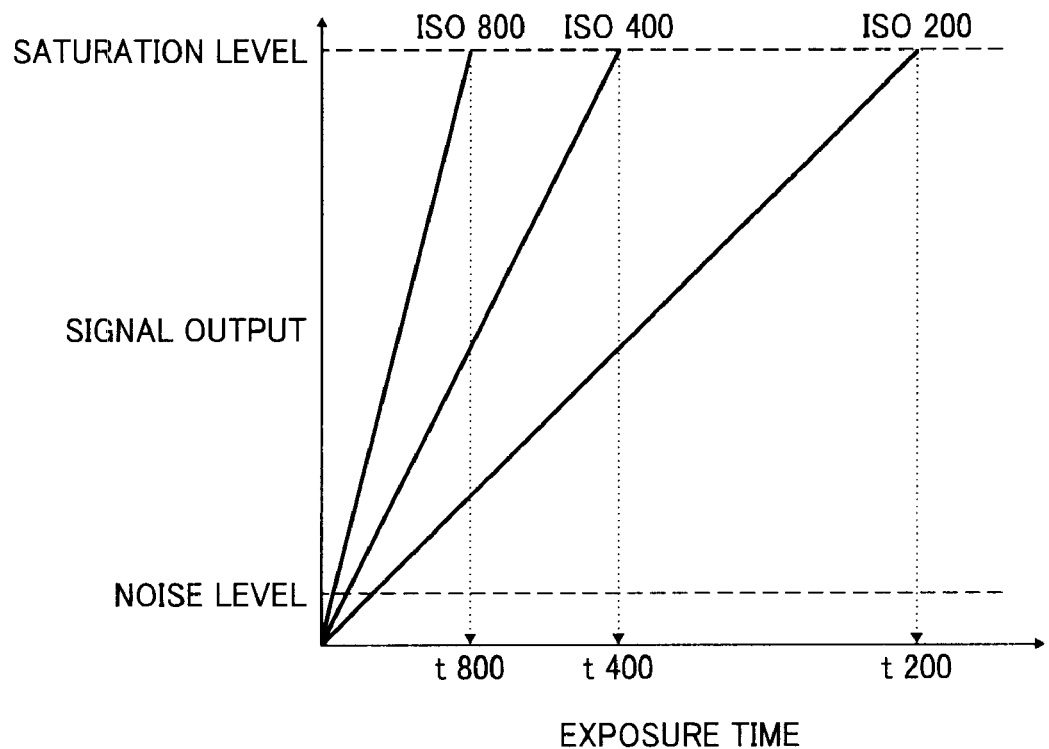
FIG. 7 is a diagram illustrating a relationship between an exposure time and a signal output in regard to ISO sensitivity under the same exposure condition as for the digital camera of FIG. 1.

Here, regarding input sensitivity of the imaging element unit 31, for example, ISO sensitivity, an explanation will be slightly added with reference to FIG. 7. FIG. 7 expresses a relationship between an exposure time and a signal output in the case where the setting of ISO sensitivity is changed under the same exposure condition. For example, by setting ISO sensitivity at ISO200, ISO400, and ISO800, a gain setting of the imaging element unit 31 is changed. For example, as for an exposure time reaching to a saturation level, comparing the case of ISO200 with that of ISO400, an exposure time in the case of ISO400 is a half of an exposure time in the case of ISO200, and comparing the case of ISO400 with that of ISO800, an exposure time in the case of ISO800 is a half of the exposure time in the case of ISO400.

For example, in the present embodiment, as predetermined sensitivity, ISO sensitivity of switching from the first supplier 26a to the second supplier 26b is set at ISO800. In this case, in the portrait mode or the face mode in which a shooting which is less affected by noise is desired, switching from the first power supplier 26a to the second power supplier 26b is performed at ISO400 or ISO200.

In addition, a noise level is not always stable, and generally, as the temperature rises, the noise level rises, and noise also exists per cell.

And depending on the remaining amount of a battery, as the power supply for the imaging element unit 31, either the first power supplier 26a with low power consumption or the second power supplier 26b which is less affected by noise can be selected and used. In this case, in the case where the first power supplier 26a with low power consumption is selected, the electronic switch 52 is turned on, and an output of 1.8V (first voltage) of the DC-DC converter 25 is supplied to the imaging element unit 31. In the case where the second power supplier 26b is selected, the electronic switch 52 is turned off, and an output of 3.1V (second voltage) of the DC-DC converter 25 is stepped down and stabilized to 1.8V (first voltage) by the series regulator 51, and electric power of the power supply which is less affected by noise is supplied to the imaging element unit 31. For example, in the case where the remaining amount of a battery is small, even when ISO sensitivity is equal to or more than ISO800, the first power supplier 26a with low power consumption is used. In particular, for example, in the case where the remaining amount of a battery is changed, an increase of the number of shootings by use of the first power supplier 26a with low power consumption or a selective use of the power supply depending on ISO sensitivity can be determined as a user setting.

In Step S14, in the case where the remaining amount of the battery 24 is determined to be not equal to or more than a threshold value which is set beforehand as a predetermined value, a priority setting by the user is determined to be a picture quality or the number of shootings (Step S37). The priority setting by the user can be set beforehand by the picture quality or the number of shootings, however preferably, when the remaining amount of the battery 24 is determined to be not equal to or more than the threshold value, the user is encouraged to set the priority setting. In Step S37, in the case where it is determined that priority is given to the picture quality by the user, it is considered that the power supply is intended to be selectively used depending on ISO sensitivity; therefore the operation moves to Step S15, and a selection state of the shooting mode is determined, and subsequent operations are performed.

In Step S37, in the case where it is determined that priority is given to the number of shootings by the user, it is considered that the number of shootings is intended to be increased by use of the first power supplier 26a with low power consumption. Therefore, the first power supplier 26a with low power consumption is selected as the power supply for the imaging element unit 31, and the electronic switch 52 is turned on, and an output of 1.8V (first voltage) of the DC-DC converter 25 is supplied to the imaging element unit 31 (Step S38), and the digital camera becomes a shooting standby state (Step S39). In the state of Step S39, when the user targets the main part of the photographic subject and performs a second step of the two-step operation of the shutter release button 201, that is, the shutter release button 20 is fully-pressed, and then a shooting is performed with low power consumption (Step S40).

Though it is not illustrated, during monitoring by which an image to be imaged is not greatly affected, the first power supplier 26a with low power consumption is used for a supply of electric power of the power supply to the imaging element unit 31, and only when shooting, the second power supplier 26b is used for the supply of electric power of the power supply to the imaging element unit 31, and thereby a supply of electric power of the power supply which is less affected by noise can be performed.

The imaging apparatus as described above makes it possible to achieve both an implementation area reduction and maintenance of a picture quality, without reducing the number of shootings more than necessary. That is, it is preferable to have two power supply systems or equal to or more than two power supply systems which supply electric power of the power supply to the imaging element unit 31 having the image sensor 3. For example, in the case where there are five circuit elements of an IC and the like operated by a power supply voltage of 1.8V (first voltage) and two circuit elements of an IC and the like operated by a power supply voltage of 3.1V (second voltage), electric power is supplied from, for example, the first power supplier 26a of 1.8V to the five circuit elements of 1.8V, and electric power is supplied from, for example, the second power supplier 26b of 3.1V to the two circuit elements of 3.1V. In this case, the number of circuit elements to which electric power is supplied is more in a power supply line of the first power supplier 26a of 1.8V than in the second power supplier 26b of 3.1V; therefore a probability of noise contamination rises, and noise contamination of the second power supplier 26b of 3.1V lowers.

And by selectively switching the two systems between the first power supplier 26a which also supplies electric power to the first circuit group 53 using a voltage of 1.8V and the second power supplier 26b which steps down a voltage from a power supply of 3.1V for supplying electric power to the second circuit group 52 using a voltage of 3.1V to a voltage of 1.8V by use of the series regulator 51, the voltage of 1.8V is supplied to the imaging element unit 31, and the imaging element unit 31 is operated.

Thus, the following advantages can be obtained by selectively switching between the two power supply systems and supplying electric power to the imaging element unit 31.

When a gain of the imaging element unit 31 is low and it is difficult to be affected by noise as a low-sensitivity shooting where ISO sensitivity is low and the like, a voltage of 1.8V (first voltage) is supplied from the first power supplier 26a with low power consumption to the imaging element unit 31, and when a gain of the imaging element unit 31 is high and it is easy to be affected by noise as a high-sensitivity shooting where ISO sensitivity is high and the like, a voltage of 3.1V (second voltage) from the second power supplier 26b is stepped down and stabilized to a voltage of 1.8V (first voltage) by the series regulator 51, and electric power of the power supply which is less affected by noise is supplied to the imaging element unit 31. Therefore, if noise contamination occurs in a power supply system, an influence of noise does not be appear in an image to be imaged at high ISO sensitivity shooting. In addition, it is possible to easily form a shorter power supply line from the series regulator 51 to the imaging element unit 31 than a power supply line which supplies electric power directly from the DC-DC converter 25 to the imaging element unit 31, and more effectively prevent noise contamination in this part.

At shootings except for the high-sensitivity shooting where ISO sensitivity is high and the like, electric power of 1.8V from the first power supplier 26a with low power consumption is supplied to the imaging element unit 31. Therefore, in the second power supplier 26b, it is possible to suppress power consumption which is necessary to produce a voltage of 1.8V (first voltage) by a series regulator and the like from a voltage of 3.1V, and suppress a reduction of the number of shootings.

In addition, there is no need to place a power supply line exclusively for supplying electric power to the imaging element unit 31 having the image sensor 3 such as a CMOS image sensor, and therefore this makes it possible to reduce a circuit size and miniaturize a printed-circuit board and like of the digital camera.

Advantages due to being configured to selectively switch between the two power supply systems and supply electric power to the imaging element unit 31 as described above will be explained more specifically.

Figure 8:
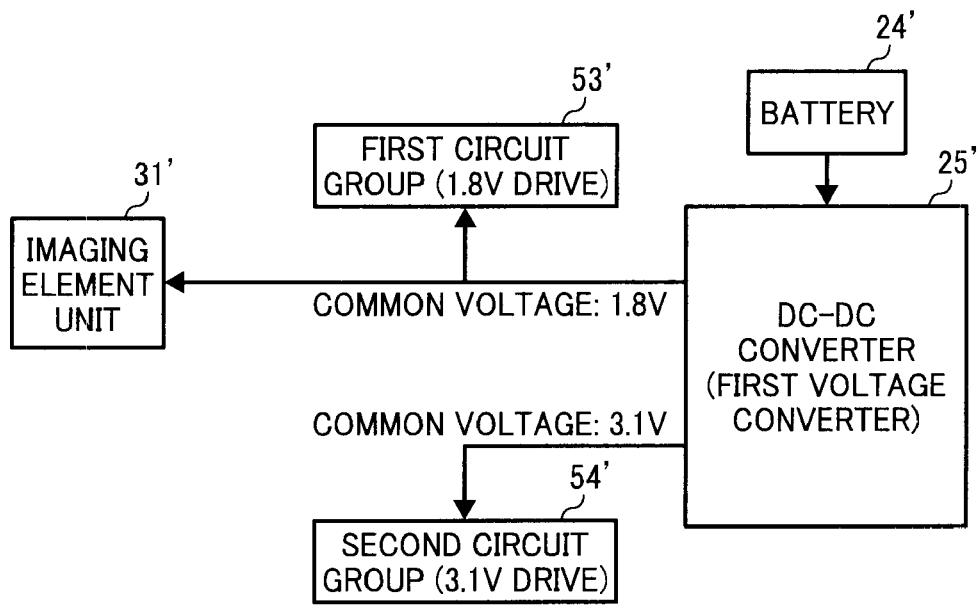
FIG. 8 is a block diagram illustrating a configuration of a general example of a power supply system for an imaging element and other electronic circuits.
Figure 9:
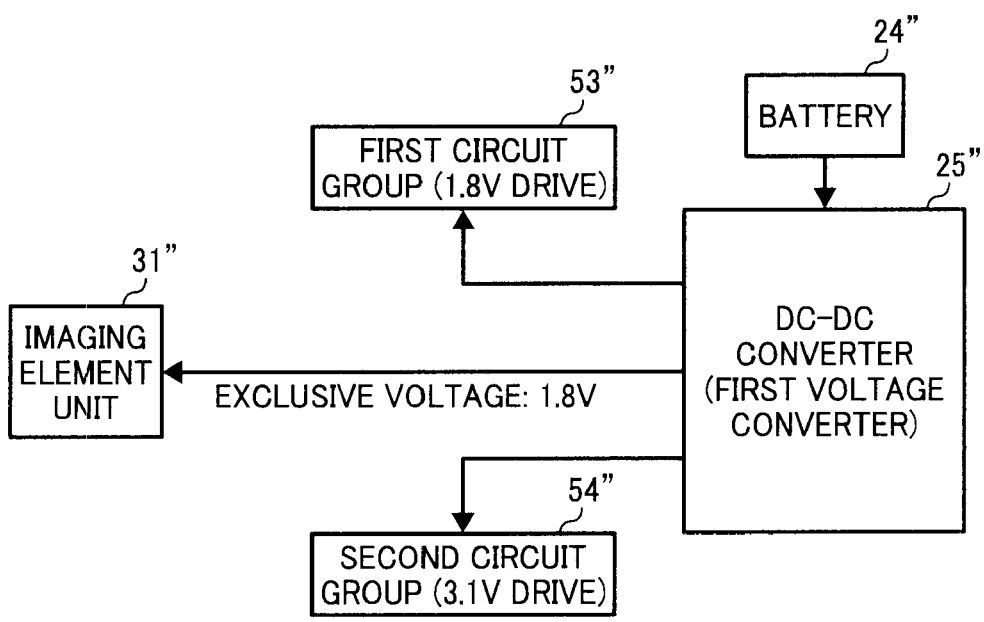
FIG. 9 is a block diagram illustrating another configuration of a general example of a power supply system for an imaging element and other electronic circuits.

With reference to FIGS. 8 and 9, a configuration of a power supply system in the case where the power supply system configured as the embodiment of the present invention illustrated in FIG. 5 is not used will be considered. A general power supply system is configured as illustrated in FIG. 8. In FIG. 8, in the case where there are an imaging element unit 31' which is operated by power supply of 1.8V, and additionally a first circuit group 53' which is operated by power supply of 1.8V, and a second circuit group 54' which is operated by power supply of 3.1V, an output voltage of a battery 24' is converted by a DC-DC converter 25', and thereby a voltage of 1.8V and a voltage of 3.1V are outputted. An output of 1.8V of the DC-DC converter 25' supplies electric power to the imaging element unit 31' and the first circuit group 53', and an output of 3.1V supplies electric power to the second circuit group 54'. In such a configuration of FIG. 8, as described above, an influence of noise at a high-sensitivity shooting becomes a problem.

Moreover, in a power supply system illustrated in FIG. 9, in order to prevent noise contamination of an imaging element unit 31" operated by power supply of 1.8V, a power supply system exclusively for the imaging element unit 31" is configured. That is, in the case where a first circuit group 53" operated by power supply of 1.8V and a second circuit group 54" operated by power supply of 3.1V additionally exist, an output voltage of a battery 24" is converted by a DC-DC converter 25", and thereby a voltage of 1.8V exclusively for the imaging element unit 31", a voltage of 1.8V for the first circuit group 53", and a voltage of 3.1V for the second circuit group 54" are outputted. An output of 1.8V exclusively for the imaging element unit 31" of the DC-DC converter 25" supplies electric power to the imaging element unit 31", and an output of 1.8V for the first circuit group 53" supplies electric power to the first circuit group 53", and an output of 3.1V for the second circuit group 54" supplies electric power to the second circuit group 54". By such a configuration of FIG. 9, it is possible to effectively prevent noise contamination to the imaging element unit 31"; however a line (pattern) forming a power supply line exclusively to the imaging element unit 31" from the DC-DC converter 25" is needed.

As described above, as a first voltage converter, the DC-DC converter 25 with high electric power conversion efficiency like a switching-mode power supply (switching regulator), for example, is used. In this case, a switching frequency of on/off control of the switching-mode power supply or a duty ratio of on/off control is changed depending on a state of the battery 24 as power supply. In general, due to a decrease of a battery voltage of power supply, a ripple of an output voltage tends to increase. Accordingly, as the battery voltage lowers, a ripple component becomes noise, and therefore it is preferable to set ISO sensitivity of switching from the first power supplier 26*a* to the second power supplier 26*b* lower than that of the above (ISO sensitivity, for example, not at ISO800 but at ISO400).

As a second voltage converter, a step-down regulator, for example, the series regulator 51 is used. By the series regulator 51 itself, on/off control is not performed, and therefore ripple noise is not generated. As the second voltage converter, additionally a configuration in which a noise component of an input side is absorbed and a stable voltage conversion output is performed is desired. On the other hand, in this type of voltage converter, a voltage drop is dissipated as Joule heat, and therefore electric power conversion efficiency is low. In this case, generally, as a voltage difference between input and output is small, the efficiency is high, and as the voltage difference is large, output stability is high; however as described in the above embodiment, in the case of stepping down from 3.1V to 1.8V, a stable output can be expected.

As voltage converters, there still are various configurations, however in the imaging apparatus as in this case, due to restriction such as being operated by a battery, a limitation of an implementation space, and so on, it is considered that a combination of the voltage converters as described above is preferable.

According to the embodiment of the present invention, it is possible to provide an imaging apparatus which is capable of effectively solving or moderating problems of obvious appearance of noise due to a high-sensitivity imaging element, noise contamination due to miniaturization, a limitation of the number of shootings for a battery, noise contamination due to types of imaging elements, and so on.

That is, according to the imaging apparatus of the embodiment, particularly, it is possible to effectively deal with the obvious appearance of noise due to an high-sensitivity imaging element, and reduce noise in the case of high sensitivity, and efficiently use the power supply.

Additionally, according to the imaging apparatus of the embodiment, particularly, it is possible to effectively suppress noise due to a high-sensitivity imaging element, and image an image of a photographic subject with less noise in the case of high sensitivity.

Additionally, according to the imaging apparatus of the embodiment, particularly, it is possible to effectively prevent noise contamination to a power supply line to an imaging element, and image an image of a photographic subject with less noise.

Additionally, according to the imaging apparatus of the embodiment, particularly, it is possible to effectively suppress noise due to a high-sensitivity imaging element based on a remaining amount of a battery as the power supply, and depending on the remaining amount of the battery, image an image of a photographic subject with less noise in the case of high sensitivity.

Additionally, according to the imaging apparatus of the embodiment, particularly, it is possible to effectively suppress noise due to a high-sensitivity imaging element based on a shooting scene, and depending on the shooting scene, image an image of a photographic subject with less noise in the case of high sensitivity.

Additionally, according to the imaging apparatus of the embodiment, particularly, it is possible to more effectively suppress noise due to a high-sensitivity imaging element when shooting a person, and more effectively image an image of a photographic subject with less noise when shooting the person in the case of high sensitivity.

Additionally, according to the imaging apparatus of the embodiment, particularly, it is possible to effectively suppress noise due to high ISO sensitivity, and image an image of a photographic subject with less noise in the case of high ISO sensitivity.

Additionally, according to the imaging apparatus of the embodiment, particularly, it is possible to operate an imaging element by effective power supply control based on at least one of an operation state and a photographic subject condition, and effectively achieve low noise and power saving.

Additionally, according to the imaging apparatus of the embodiment, particularly, it is possible to deal with the obvious appearance of noise due to a high-sensitivity imaging element, and achieve low noise and power saving in the case of high sensitivity.

Additionally, according to the imaging apparatus of the embodiment, particularly, it is possible to regulate a supply of electric power to an imaging element depending on a shooting mode, and achieve low noise and power saving.

Additionally, according to the imaging apparatus of the embodiment, particularly, it is possible to regulate a supply of electric power to an imaging element depending on a remaining amount of a battery as the power supply, and achieve low noise and power saving.

Additionally, according to the imaging apparatus of the embodiment, particularly, it is possible to achieve low noise and power saving effectively for an image element using a CMOS image sensor.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus comprising:
    a power supply;
    a first voltage converter which produces a first voltage and a second voltage which are different from each other, based on an output of the power supply, and outputs them to a first output system and a second output system, respectively;
    a second voltage converter which produces the first voltage based on the second voltage produced by the first voltage converter and outputted to the second output system, and outputs the first voltage to a third output system;
    an imaging element which is operated by the first voltage as a power supply voltage, and photoelectrically-converts an optical image of a photographic subject and obtains image data;
    at least one circuit element which is operated by at least one of the first voltage and the second voltage as a power supply voltage;
    a sensitivity setting section which sets an input sensitivity of the imaging element based on at least one of a user's operation and information of the photographic subject; and
    a power supply switching section which switches to supply the first voltage of the first output system to the imaging element in the case where the input sensitivity set by the sensitivity setting section is lower than a predetermined sensitivity, and switches to supply the first voltage which is from the third output system to the imaging element in the case where the input sensitivity set by the sensitivity setting section is higher than the predetermined sensitivity, wherein in the case where the input sensitivity set by the sensitivity setting section is low, the imaging element is driven by the first voltage from the first output system, and in the case where the input sensitivity set by the sensitivity setting section is high, the imaging element is driven by the first voltage from the third output system.

2. The imaging apparatus according to claim 1, wherein the first voltage converter sets the second voltage higher than the first voltage, and the second voltage converter is a step-down regulator which steps down and stabilizes the second voltage to obtain the first voltage.

3. The imaging apparatus according to claim 1, wherein a power supply line of the first voltage from the second voltage converter to the imaging element is placed and formed to have a length shorter than a power supply line of the first voltage from the first voltage converter to the imaging element.

4. The imaging apparatus according to claim 1, further comprising:
 a remaining amount determining section which determines a remaining amount of the power supply,
 wherein the power supply is a battery, and in a case where the remaining amount determining section determines that the remaining amount of the battery is smaller than a predetermined value, the predetermined sensitivity is set low and the power supply switching section switches a power supply system which drives the imaging element.

5. The imaging apparatus according to claim 1, further comprising:
 a shooting mode selector which selects a proper shooting mode based on a photographic subject condition when shooting from a plurality of shooting modes which are set based on a shooting condition beforehand, and an input sensitivity of the imaging element is set for each of the plurality of shooting modes.

6. The imaging apparatus according to claim 5, wherein in a case where at least one of a portrait mode for performing a portrait shooting of a person and a face mode for recognizing a face of a photographic subject to shoot is set by the shooting mode selector, the predetermined sensitivity is set low and the power supply switching section switches a power supply system which drives the imaging element.

7. The imaging apparatus according to claim 1, wherein the sensitivity setting section includes an ISO (international organization for standardization) sensitivity setting section which sets the input sensitivity of the imaging element corresponding to ISO sensitivity.

8. The imaging apparatus according to claim 1, wherein the imaging element is a CMOS (complementary metal-oxide semiconductor) image sensor.

9. An imaging apparatus comprising:
 a power supply including a battery;
 a first voltage converter which produces a first voltage and a second voltage higher than the first voltage which are different from each other, based on an output of the power supply, and outputs them to a first output system and a second output system, respectively;
 a second voltage converter including a step-down regulator which steps down and stabilizes the second voltage produced by the first voltage converter and outputted to the second output system to produce the first voltage, and outputs the first voltage to a third output system;
 an imaging element which is operated by the first voltage as a power supply voltage, and photoelectrically-converts an optical image of a photographic subject to obtain image data;
 at least one circuit element which is operated by at least one of the first voltage and the second voltage as a power supply voltage; and
 a power supply switching section which selectively switches to supply the first voltage of the first output system to the imaging element, or to supply the first voltage from the third output system to the imaging element, based on at least one of a state of the imaging apparatus and a shooting condition of a photographic subject,
 wherein the first voltage from the first output system and the first voltage from the third output system are selectively switched to drive the imaging element.

10. The imaging apparatus according to claim 9, wherein the power supply switching section selectively switches to supply the first voltage of the first output system to the imaging element, or to supply the first voltage from the third output system to the imaging element, depending on a setting of an input sensitivity of the imaging element.

11. The imaging apparatus according to claim 9, further comprising:
 a shooting mode selector which selects a proper shooting mode based on a photographic subject condition when shooting from a plurality of shooting modes which are set based on a shooting condition beforehand,
 wherein the power supply switching section selectively switches to supply the first voltage of the first output system to the imaging element, or to supply the first voltage from the third output system to the imaging element, depending on a shooting mode which is selected by the shooting mode selector.

12. The imaging apparatus according to claim 9, further comprising:
 a remaining amount determining section which determines a remaining amount of a battery as the power supply,
 wherein the power supply switching section selectively switches to supply the first voltage of the first output system to the imaging element, or to supply the first voltage from the third output system to the imaging element, depending on the remaining amount of the battery which is determined by the remaining amount determining section.

* * * * *